B. G. PATTERSON.
RAIN GAGE.
APPLICATION FILED JUNE 7, 1915.
1,173,022.
Patented Feb. 22, 1916.
3 SHEETS—SHEET 1.
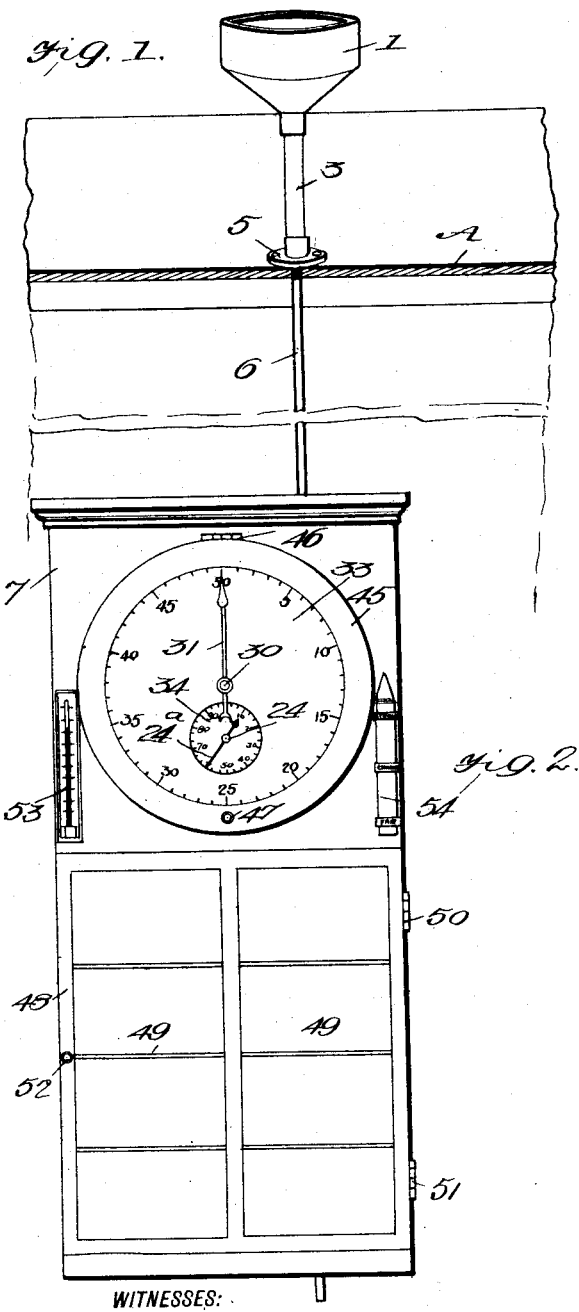
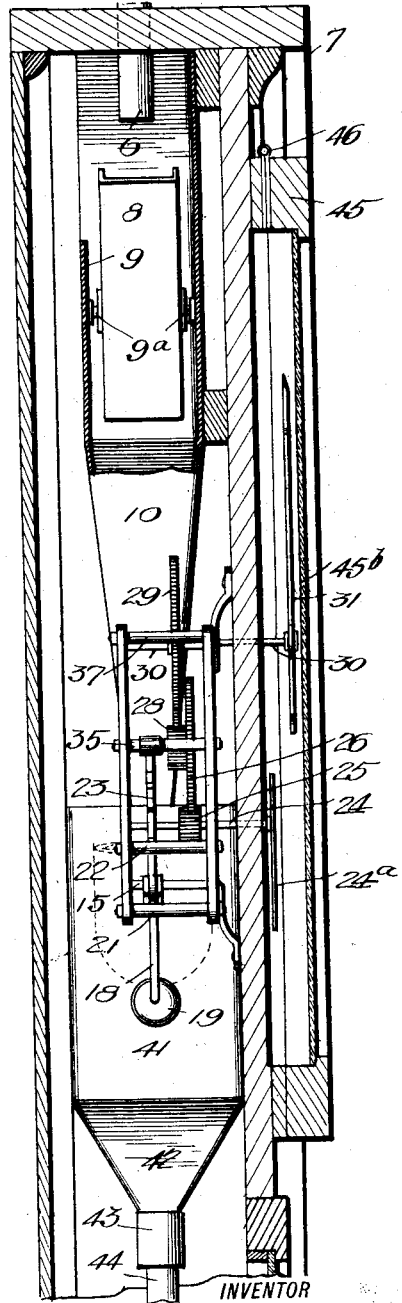
WITNESSES:
INVENTOR
Benjamin G. Patterson
BY
ATTORNEYS

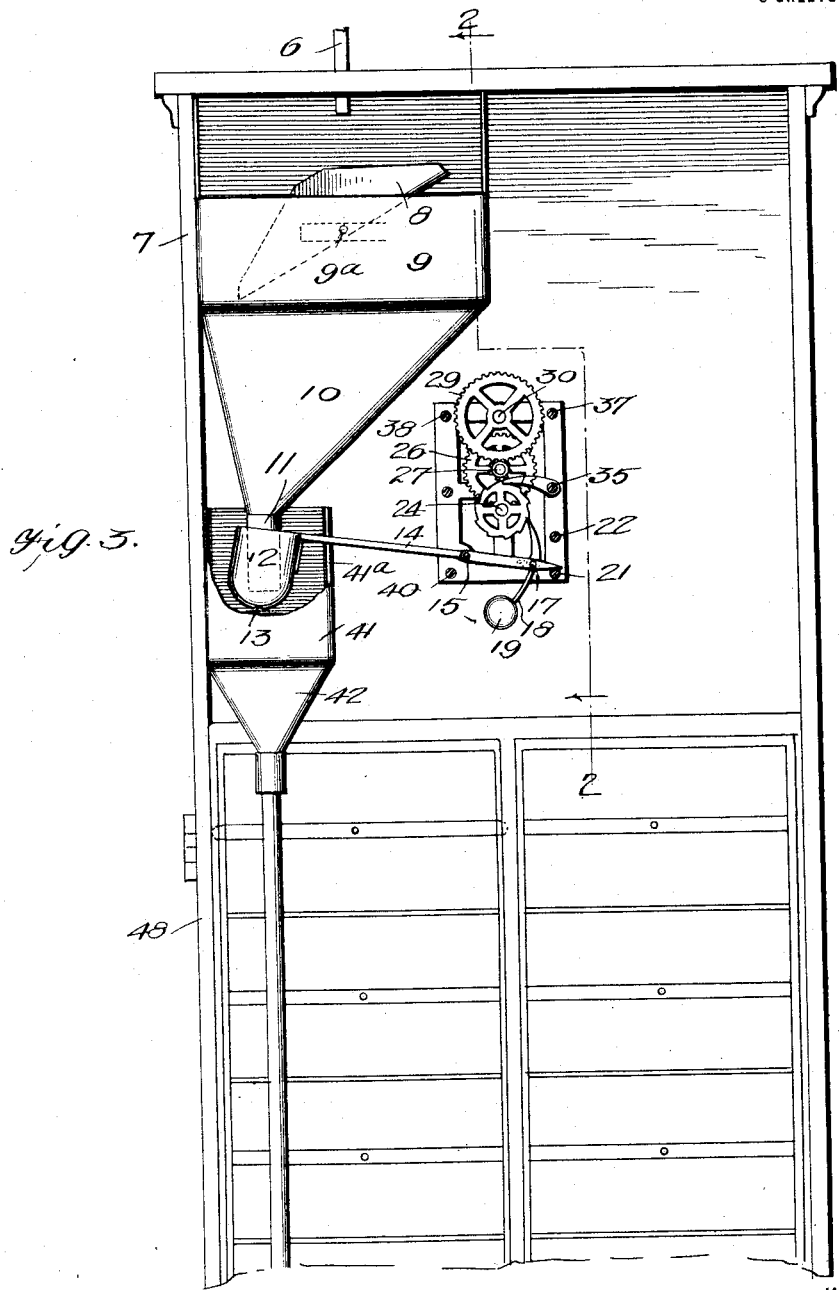

B. G. PATTERSON.
RAIN GAGE.
APPLICATION FILED JUNE 7, 1915.
1,173,022.
Patented Feb. 22, 1916.
3 SHEETS—SHEET 3.
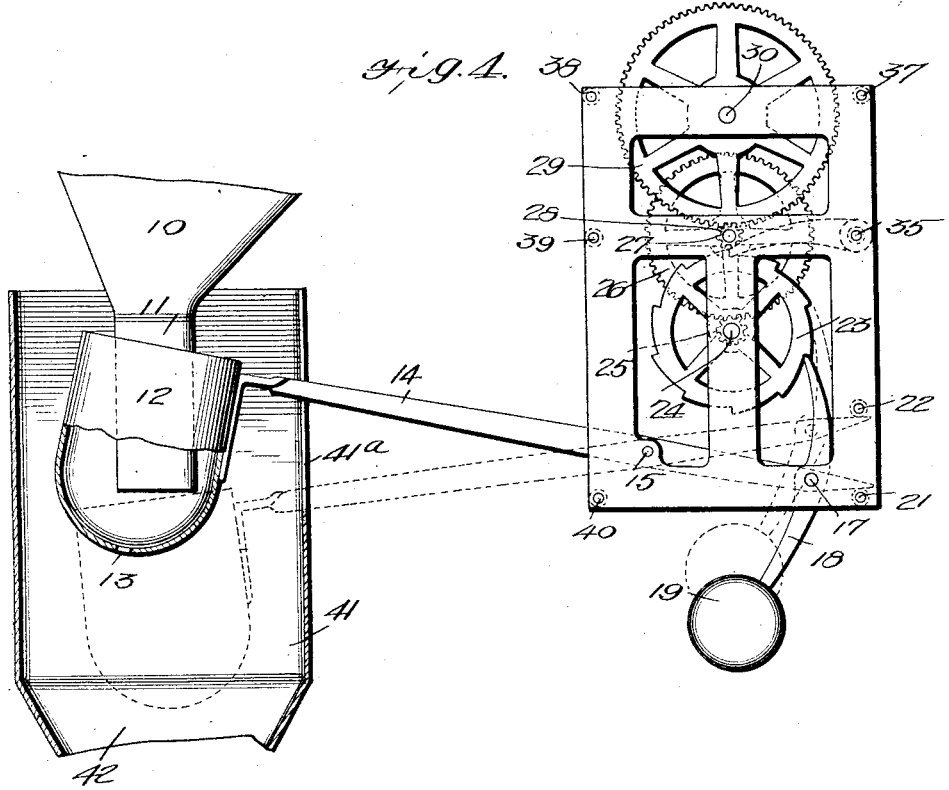
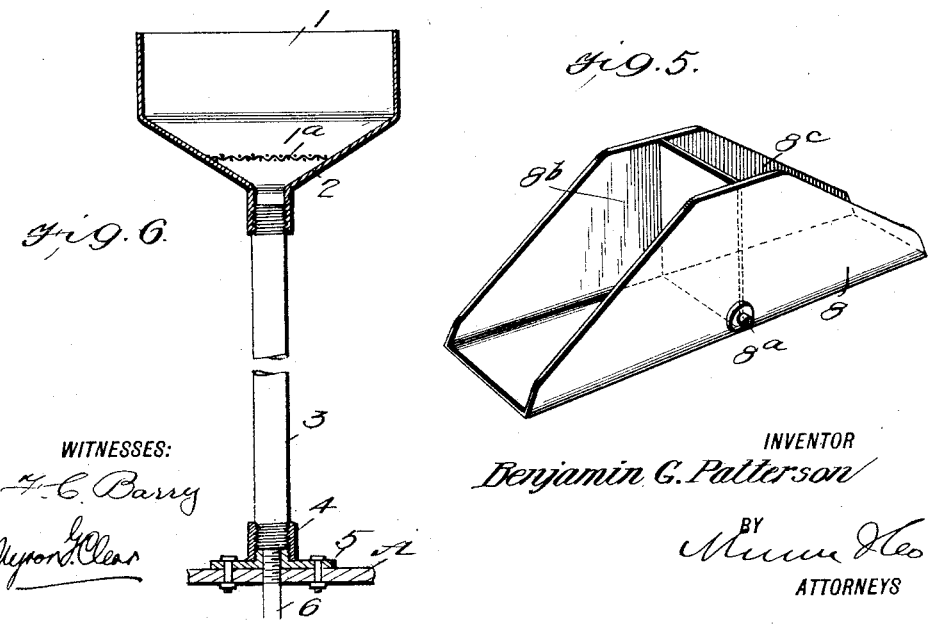
WITNESSES:
INVENTOR
Benjamin G. Patterson
BY
ATTORNEYS
THE COLUMBIA PLANOGRAPH CO., WASHINGTON, D. C.

UNITED STATES PATENT OFFICE.

BENJAMIN G. PATTERSON, OF OKLAHOMA, OKLAHOMA.

RAIN-GAGE.

1,173,022.

Specification of Letters Patent.

Patented Feb. 22, 1916.

Application filed June 7, 1915. Serial No. 32,549.

*To all whom it may concern:*

Be it known that I, BENJAMIN G. PATTERSON, a citizen of the United States, and a resident of Oklahoma city, in the county of Oklahoma and State of Oklahoma, have invented a certain new and useful Improvement in Rain-Gages, of which the following is a specification.

My invention relates generally to improvements in devices for the purpose of catching and measuring rainfall, commonly known as rain gages, and more especially to that class of rain gages employing a double compartment tilting or oscillating vessel for measuring the water.

In the use of such automatic measuring devices as now proposed, it is necessary to have some registering device in connection therewith to register the oscillations of the measuring vessel, and it has been the practice to attach such mechanism for registration, directly to the measuring vessel so that the oscillating movements of the measuring vessel will drive the registering mechanism, and as such an arrangement requires a quantity of water sufficient to tilt the measuring vessel and also drive the mechanism, it is obvious that any variation in the amount of friction will vary the quantity of water required in the measuring vessel. In other words, if the mechanism becomes dirty or gummed in its bearings, an increase of water to operate it will be necessary, any variation in the friction of the mechanism being certain to cause a corresponding variation in the quantity of water handled by the measuring vessel.

Inasmuch therefore as a maximum degree of accuracy in measurement can be attained only by a minimum degree of friction in the journal bearings attached to a vessel of this kind, the primary object of my invention is to produce a device having a registering mechanism that is driven by the intermittent discharges of water from the measuring vessel, through means independent entirely of the measuring vessel, so that the latter is permitted to oscillate freely without any attachments thereto, and this is preferably accomplished by means of a registering mechanism and a member operatively connected to the said registering mechanism and actuated by each fluid discharge from the measuring vessel, the said member including an apertured cup disposed beneath the measuring vessel to receive the discharge therefrom, from which the water may gradually leak through its apertures between such discharges from the measuring vessel.

Another object of my invention is to produce a rain gage having a dial and registering mechanism in combination with a receptacle, tube, measuring vessel, funnel and waste tube, so that the receptacle for initially catching the rainfall may be placed upon a house top, the gage itself being disposed within a room of the house, with the tube extending thereto from the roof receptacle, and the waste tube extending from the gage downwardly to the outside of the building, whereby to thus catch, measure, and register the amount of rainfall during an entire year, or throughout practically any period, without requiring constant and troublesome attention.

With these and certain other objects in view, which will hereinafter more fully appear, my invention consists in the construction, arrangement, and operation of parts to be now described with reference to the accompanying drawings, forming a part of this specification, and in which—

Figure 1 is a front elevation of the rain gage embodying my invention. Fig. 2 is a vertical sectional view taken therethrough on line 2—2 of Fig. 3, and looking in the direction of the arrow. Fig. 3 is a rear elevation with the rear side of the casing removed, and with certain of the other parts removed and broken away for purposes of better illustration. Fig. 4 is a detail view partly in elevation and partly in section, illustrating certain parts to be hereinafter specifically referred to. Fig. 5 is a detail perspective view of the measuring vessel, and Fig. 6 is a detail view partly in elevation and partly in section of the rainfall receiving receptacle and its tube leading downwardly to the gage.

Referring now to the several figures in which like parts are represented by like characters throughout the specification, 1 is a receptacle for catching the rainfall, provided with a screen $1^a$ located slightly above the bottom of the receptacle as best seen in Fig. 6, to prevent trash from entering the pipe 3 which leads downwardly from the lower conical portion 2 of the said receptacle, and the lower end of which pipe 3 is secured, by means of a coupling 4, to a circular plate 5 having a hub threaded to receive the said coupling, and further provided with a central opening to receive the upper end of a depending tube 6 preferably formed of soft copper so that it may be suitably bent and led directly to the casing or cabinet 7 of the gage itself, the receptacle 1 and its pipe 3 being disposed above the roof A of a building within which the casing or cabinet 7 of the gage is to be disposed.

Within the cabinet or casing 7 is a measuring vessel 8 which journals on trunnions 8ª at lower intermediate points of its sides, and is provided with two compartments 8ᵇ and 8ᶜ as most plainly seen by reference to the detail Fig. 5, this vessel being adapted to oscillate and alternately discharge the contents of its compartments 8ᵇ and 8ᶜ when a predetermined quantity of water has been received into either of such compartments, as is ordinarily the case with a measuring vessel of this type, disposed as it is below the lower end of the tube 6 entering the upper portion of the casing or cabinet as best seen by reference to Fig. 3.

Each of the compartments 8ᵇ and 8ᶜ of the measuring vessel 8 is in size a known relative area as compared to the receptacle 1, so that when full to the tilting or oscillating point, the particular compartment will hold a predetermined fraction of an inch of water in the area of the receptacle 1. The accompanying drawings show all parts in substantially the proper proportion relatively to each other for measuring and registering in fractions of inches equal to one-tenth of an inch in the area of the receptacle 1, and the dials as will be hereinafter mentioned, of the registering device, are also made to show the measurements in inches and tenths of inches accordingly. However, it is to be understood that the parts may be proportioned to measure and register in hundreds of inches, without departing from the spirit of the invention.

The trunnions 8ª of the measuring vessel 8 work in bearings 9ª located upon the inner opposite side of a funnel 9 disposed within the casing or cabinet 7 and having an upper opening at one side to permit of insertion and removal of the measuring vessel, the lower part 10 of this funnel terminating at its lower end in an integral depending spout 11. Below this spout 11 is a cup 12 carried by one end of a lever 14, and provided with a lower opening 13 constituting a leak port for a purpose to be now described. As seen in Figs. 3 and 4, the cup 12 is in its normal position in which the spout 11 extends into the same, so that when the vessel 8 oscillates or tilts and discharges its contents into the funnel 9, the water flows suddenly into the cup 12 and causes the cup and lever 14 to move downwardly, the water so discharged into the cup 12 quickly leaking out through its opening 13 to permit the latter to empty and raise in less time than the opposite compartment of the measuring vessel can fill even during the hardest rain. This arrangement permits the vessel 8 to be free of any attachments to retard its oscillating or tilting action by the gravity of a predetermined quantity of water, and it also permits the housing of the vessel 8 and the cup 12 apart from the other mechanisms and the confinement of the water, so that the mechanism can be put into a wooden case without any damaging effect from dampness. A much greater power may be developed or transmitted through the gear mechanism by this arrangement, than a direct attachment to the oscillating or tilting vessel would provide, causing more positive and reliable action of the apparatus. The leak cup 12 is a simple device for this purpose, and by its use the vessel 8 is relieved of any burden and given a maximum accuracy in measurement of the rainfall, the entire power of the gravity of the water being transmitted through the leak cup, lever 14, and the registering mechanism to be hereinafter described, to the pointers operating on the dial, which permits the making of all parts heavier than has been heretofore possible.

The cup 12 as shown, is secured to one end of the lever 14, the latter having an intermediate fulcrum at 15 and carrying a pawl 16 at its opposite end, this pawl being pivotally mounted upon the arm at 17 and provided with a lower projection 18 carrying a weight 19, the purpose of which is to hold the pawl in engagement with the ratchet teeth on the ratchet wheel 23 and to normally hold the cup 12 in its upper position around the lower end of the spout 11, as shown in full lines in Fig. 4. The ratchet wheel 23 just mentioned is mounted on a shaft 24, one end of which carries a small pointer 24ª as seen in Fig. 1. This shaft 24 also carries a small pinion 25 which meshes with a gear wheel 26 mounted on a shaft 27 having also a pinion 28 meshing with a gear wheel 29 mounted on a shaft 30 which latter shaft carries a large pointer on one end as also shown in Fig. 1.

The shafts 24, 27, and 30 just mentioned are journaled in frame plates 32 and 32ª which are spaced apart by posts 21, 22, 35, 37, 38, 39 and 40, the posts 21 and 22 being located and spaced apart a proper distance to serve as guide stops for the pawl carrying end of the lever 14 as best seen in Fig. 4, thus limiting the up and down movement of this end of the lever. A dial 33 is located on the face of the cabinet and provided with a smaller dial 34, these dials being respectively traversed by the pointers 31 and 24ª, and being covered by means of a glass 45ᵇ held in a circular frame 45 which is hinged to the cabinet at 46 and provided with a catch fastening 47. A door 48, provided with glass panels 49, is hinged to the lower front portion of the cabinet at 50 and 51, and is provided with a catch fastening at 52. A waste water funnel is shown at 41, the lower conical portion 42 of which is attached to the upper end of a waste tube 44 by a coupling 43, this waste tube extending downwardly and exteriorly through the lower end of the casing or cabinet 7 and through the floor or wall of the building to a suitable point of discharge at the outside thereof, if desired. However, a suitable receptacle may be placed beneath the lower end of the discharge tube 44 to receive the water so that it may be measured with a measuring stick in the ordinary manner to check up the accuracy of the measuring device.

As seen particularly in Fig. 4, the waste water funnel 41 is provided with a slot 41ª in which the lever 14 works, the spout 11 extending into the upper end of the said waste water funnel as plainly seen in this figure, and the cup 12 being entirely housed thereby so that the water leaking from the cup 12 through its aperture 13 will be received by the funnel 41 and delivered thereby to the discharge tube 44.

Referring again to the dial 33, the inch scale is located at the periphery thereof, and the large pointer 31 thus indicates the number of inches of rainfall. The scale for fractions of inches is located around the periphery of the small dial 34 and the small hand 24ª thus indicates the fractions of inches of rainfall, the ratchet 23 and the gear mechanism being so arranged in proportion that the large pointer is moved from the one inch mark on the dial to another inch mark at each complete revolution of the small pointer 24ª, and it is to be understood that the small pointer may be made to travel in hundreds or in tenths without departing from the invention.

By thus separating the mechanism from the measuring vessel so that the latter may act freely, the measuring vessel itself may be made smaller and the receptacle 1 may also be much smaller than usual, resulting in economy and more correct measurements with less water being used.

Having thus described the parts in detail, I will now describe its operation during rain. It is intended in the first place that the casing or cabinet will be installed in a room in the same manner as a wall clock, the receptacle 1 being placed upon the roof of the building in the following manner: A small hole is made in the roof through which to put tube 6, after securely fastening this tube in the center of the circular plate 5. This plate is then fastened to the roof with a gasket below the plate and between the same and the roof to prevent leaks, and the tube 6 is then run down through the building to the casing or cabinet and enters the top thereof directly above the center of the measuring vessel 8, so that water flowing downwardly through this tube will fall into either one compartment or the other of the vessel dependent upon the direction in which it is tilted. The waste tube 44 is then extended through the floor or wall of the building to the outside if desired, and thus the rain when it falls, is caught in the receptacle 1 and flows down through the tube 6 into the oscillating or tilting vessel 8, which is overbalanced when a predetermined quantity of water has entered the compartment that is uppermost, so that it oscillates or tilts and discharges the contents of such compartment into the funnel 9 which delivers the discharge through spout 11 into cup 12. The weight of the water thus discharged into the cup 12 causes the same to lower and rock the lever 14 upon its pivot 15, this movement causing pawl 16 to engage a tooth on the ratchet wheel 23 and move the wheel one step, or a distance equal to one tooth, the gearing between the same and the pointers on the dial, transmitting movement to the pointers so as to advance the same the fraction of an inch of rainfall that has passed the measuring vessel at the tilting movement thereof. The water discharged into cup 12 in the manner just described, leaks out quickly and the cup returns to normal position ready for the next discharge of water from the measuring vessel, the leaking water being caught by the funnel 41 from which it is discharged through the waste pipe 44. A thermometer 53 and storm glass 54 are preferably located on the face of the casing or cabinet 7 so that in addition to the amount of rainfall, the temperature and weather conditions may be read from the face of the gage.

I claim:

1. In an automatic measuring device of the character described, the combination of an oscillatory receiving and measuring vessel freely mounted to tilt under the weight of fluid received thereby, a registering device independent of said vessel, a funnel in which said vessel is mounted, a lever for actuating the said registering device having an apertured cup disposed beneath the said funnel, and a waste funnel in which the said cup is housed and into which the lower portion of the first named funnel extends, said waste funnel having a slot in which the said lever works.

2. In an automatic measuring device of the character described, the combination of an oscillatory measuring vessel freely mounted to tilt under the weight of fluid received thereby, a registering device independent of said vessel, and an actuating member for the registering device including a swinging arm having a counterweight at one end and a fluid receiving cup at its opposite end, located beneath the said measuring vessel to receive fluid discharged therefrom, and having a relatively small opening constituting a leak port for the gradual outflow of the fluid so received.

3. In an automatic measuring device of the character described, the combination of an oscillatory receiving and measuring vessel freely mounted to tilt under the weight of fluid received thereby, a registering device independent of said vessel, and a member operatively connected to the said registering device and actuated by each fluid discharge from the said measuring vessel, said member including an apertured cup disposed beneath said vessel to receive the discharge of fluid therefrom.

4. In an automatic measuring device of the character described, the combination of an oscillatory measuring vessel freely mounted to tilt under the weight of fluid received thereby, a registering device independent of said vessel, and a member operatively connected to the said registering device and actuated by each fluid discharge from the said measuring vessel.

5. An automatic measuring device of the character described, including external supply and waste pipes, the former being adapted to lead through the roof of a building in which the said device is mounted, a plate to which the upper end of the said supply pipe is connected, and a rain receiving receptacle supported by the said plate.

6. An automatic measuring device of the character described including external supply and waste pipes, the former being adapted to lead through the roof of a building in which the said device is mounted, and a rain receiving receptacle connected to said supply pipe and having a screen therein to prevent the entrance of extraneous matter into the said supply pipe.

BENJAMIN G. PATTERSON.

Witnesses:
WALTER L. PATTERSON,
S. H. PRICHARD.

Copies of this patent may be obtained for five cents each, by addressing the "Commissioner of Patents, Washington, D. C."